March 21, 1950

H. H. LAUCKS 2,501,526

COVER CAP FASTENING MEANS

Filed May 5, 1944

INVENTOR
Howard H. Laucks.
BY
Herbert L. Davis, Jr.
ATTORNEY

Patented Mar. 21, 1950

2,501,526

UNITED STATES PATENT OFFICE 2,501,526

COVER CAP FASTENING MEANS

Howard H. Laucks, Maywood, N. J., assignor to Bendix Aviation Corporation, Teterboro, N. J., a corporation of Delaware Application May 5, 1944, Serial No. 534,357

2 Claims. (Cl. 220—55)

My present invention relates to a novel arrangement and means for fastening cover caps on an instrument or mechanism such as an alternator or generator particularly as applied to aircraft devices.

This invention comprehends certain new and useful improvements in instrument or mechanism covers and fastening means for the same and has for its primary object to provide a cover which will be of such construction and secured in position in such a manner that the contents of the device may be thoroughly protected.

Another object of my present invention is to provide novel means whereby such a cover cap may be fastened in place and removed for service purposes by convenient single hand operation without use of tools.

Another object of my invention is to provide a novel housing having oppositely disposed cover caps and novel means whereby such caps may be simultaneously manually removed with opposite hands.

Another object of my invention is to provide novel means, whereby cover caps on aircraft instruments or devices may be conveniently attached and removed for service purposes.

Another object of my invention is to provide a compact cover cap which may be efficiently attached and removed and of such simplicity in construction as to adapt it for manufacture and installation at low cost.

The above and further objects and novel features of this invention will more fully appear from the following detailed description and the accompanying drawings wherein like reference characters refer to like parts in the several views. It is to be expressly understood, however, that the drawings are for the purposes of illustration only and are not designed as a definition of the limits of the invention, reference being had for this purpose to the appended claims.

Figure 1:
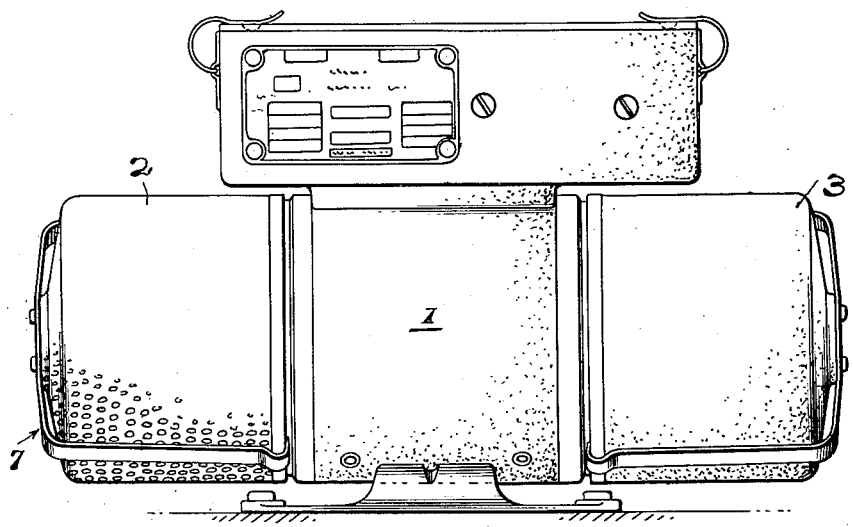
Figure 1 is a side elevational view of one form of my invention.

Referring to Figure 1 my novel cover cap arrangement is shown as applied to the housing of a device such as an alternator or generator indicated generally by numeral 1 of a type particularly adapted for aircraft use. The housing 1 has provided cover caps or cup shaped closures 2 and 3 mounted at opposite ends and enclosing suitable adjustable parts of the mechanism not shown.

Figure 2:
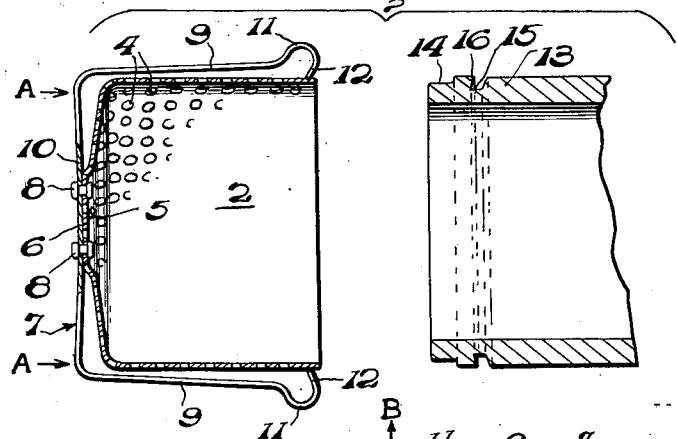
Figure 2 is a fragmentary sectional view of the left hand cover cap and fastening means of Figure 1 with the cover cap shown in a detached position.
Figure 3:
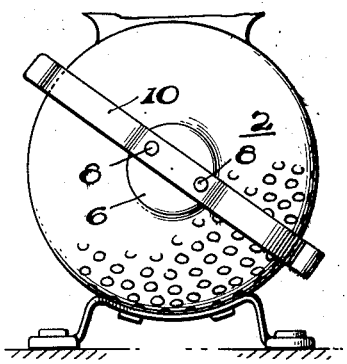
Figure 3 is an end view of the left hand cover cap of Figure 1.

As shown in Figure 2, the cover cap 2 has suitable apertures 4 formed in the skirt portion of the cap for permitting the ready cooling of a generator or motor not shown.

The cover cap 2 has provided within the end thereof a circular depression 5 which defines a projection 6. Mounted at the outer side of the projection 6 is a spring clamp 7 which is secured to the projection 6 at a point intermediate the opposite ends thereof by rivets, bolts or other suitable fastening means indicated by numerals 8.

The spring clamp 7 comprises a U-shaped construction, including substantially parallel spaced legs 9 and a connecting element 10 between these two legs 9. The free end of each of the legs 9 is bent outwardly and inwardly in a loop 11 having a hook-like locking end, as indicated by numeral 12 of Figure 2.

Figure 4:
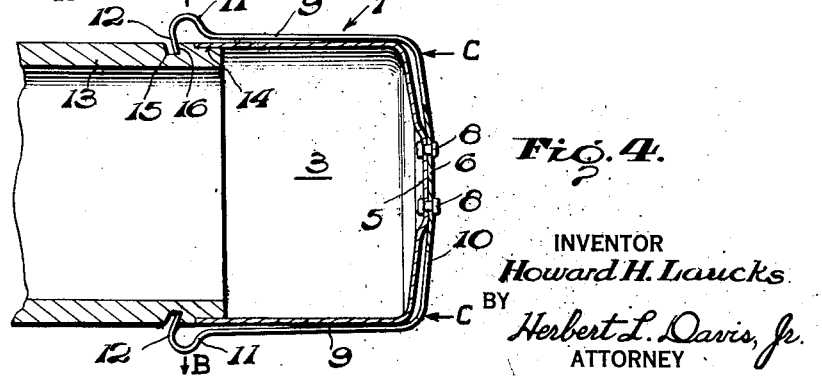
Figure 4 is a fragmentary sectional view of the right hand cover cap and fastening means of Figure 1 with the same shown in a fastened position.

The device 1 has provided a mating part 13 having an annular shoulder 14 cooperating with the cover caps 2 and 3 which fit thereon, as shown in Figure 4.

The mating part 13 is also provided with an annular groove or reentrant recess 15 into which the locking ends may seat. The groove 15 may be turned or the same may be formed in the mating part of a limited length so as to receive the locking ends in such a manner as to prevent the turning of the cover cap on the shoulder 14.

The annular groove 15 is preferably machined into the mating part so as to provide an inner surface 16 extending at an acute angle to the outer surface of the mating part so that the locking ends 12 of the spring clamp 7 may more positively lock in the annular groove 15 as shown in Figure 4. The locking ends 12 extend at a sufficient angle to assure that the same will engage in the groove 15 and the tips of the same seat at the bottom of the groove 15. The tension exerted by the clamping spring 7 is preferably such that in a free position the tips of the spring rest on the cover as indicated in Figure 2.

In locking the cover 2 in place on the mating part 13 the cover 2 is positioned on the shoulder 14 so that upon pressure being applied to the spring clamp 7 at the point A, Figure 2, the end 12 of the spring 7 will move along the mating part and into locking engagement within the annular groove 15 whereby the cover 2 will be securely held in place on the mating part 13.

In order to remove the cover cap 2 the spring leg 9 may be depressed at C preferably with the palm of the hand an amount sufficient to permit the end members 12 to disengage the edge 16 of the annular groove 15. Then by applying with the fingers an outward pull on the loop 11 so as to clear the annular groove 15, and then relieving the pressure at C the end 12 of the spring leg 9 will slide back along the outer surface of the mating part 13 onto the cover cap 2. Upon repeating the operation on the other spring leg 9 the cover cap 2 may then be removed from the mating part 13 and thus permit servicing and adjustment of the mechanism enclosed by such cap. The structure of the cover cap 3 is substantially the same as that of the cap 2 except that the cap 3 is not apertured.

From the foregoing it will be readily seen that I have provided convenient fastening means for a cover cap for a mechanism such as a generator, alternator or other similar device.

Moreover, by utilizing, as previously described, the palm of the hand for depressing the spring legs and the fingers of the same hand for pulling the looped members so as to disengage the spring clamp from the fastening means on the mating member it will be readily seen that the cover cap may be easily and conveniently removed.

Moreover, by placing the cover caps in opposite relation as indicated in Figure 1 the same may be easily and conveniently removed in the manner described by the simultaneous use of opposite hands.

What is claimed is:

1. A device of the character described comprising a housing, a cup shaped closure therefor, said cup shaped closure including a skirt portion and having an open end and a closed end, said closed end having a projecting portion, a U-shaped depressible spring locking member affixed to the closed end of said closure and engageable with said housing for securing the closure to said housing, and means for securing said locking member to said closure at said projecting portion, said locking member comprising a first intermediate portion affixed to said projecting portion by said securing means, second portions of said U-shaped locking member resiliently upstanding from the closed end of said closure and being depressible toward said closed end, leg portions of said U-shaped locking member extending along the skirt portion of said closure and beyond the open end of said closure upon depression of said second intermediate portions, and terminal portions extending from said leg portions towards said skirt portion and normally bearing upon said skirt portion in unlocked inoperative position, said housing being provided with means defining a reentrant recess for engaging and releasably retaining said terminal portions upon depression of said second portions toward the closed end of the closure, whereby said closure is secured to said housing.

2. A device of the character described comprising a housing, a cup shaped closure therefor, said cup shaped closure including a skirt portion and having an open end and a closed end, said closed end having a projecting portion, a U-shaped depressible spring locking member affixed to the closed end of said closure for securing the closure to said housing, and means for securing said locking member to said closure at said projecting portion, said locking member comprising a first intermediate portion affixed to said projecting portion by said securing means, second portions of said U-shaped locking member resiliently upstanding from the closed end of said closure and being depressible toward said closed end, leg portions of said U-shaped locking member extending along the skirt portion of said closure and slidably contacting said skirt portion in such a manner that said closure may be positioned on said housing, free of said spring locking member, each of said leg portions having terminal portions contacting the outside of the skirt portion in normal unlocked inoperative position, said housing being provided with means for engaging and releasably retaining said terminal portions upon depression of said second portions toward the closed end of the closure, whereby said closure is secured to said housing.

HOWARD H. LAUCKS.

REFERENCES CITED

The following references are of record in the file of this patent:

UNITED STATES PATENTS

| Number | Name | Date |
|---|---|---|
| 128,238 | Moran | June 25, 1872 |
| 336,730 | McFarland | Feb. 23, 1886 |
| 924,401 | Strachan et al. | June 8, 1909 |
| 1,258,224 | Jurkowski | Mar. 5, 1918 |
| 1,292,935 | Walsh | Jan. 28, 1919 |
| 1,862,560 | Willcutt et al. | June 14, 1932 |
| 2,009,516 | Pfefferkorn et al. | July 30, 1935 |
| 2,228,861 | Wegener | Jan. 14, 1941 |
| 2,378,683 | Buchanan | June 19, 1945 |